(12) United States Patent
Sammour et al.

(10) Patent No.: US 7,979,768 B2
(45) Date of Patent: Jul. 12, 2011

(54) METHOD AND SYSTEM FOR IMPLEMENTING HYBRID AUTOMATIC REPEAT REQUEST

(75) Inventors: Mohammed Sammour, Montreal (CA); Stephen E. Terry, Northport, NY (US); John S. Chen, Downingtown, PA (US); Guodong Zhang, Farmingdale, NY (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1123 days.

(21) Appl. No.: 11/688,397

(22) Filed: Mar. 20, 2007

(65) Prior Publication Data

US 2007/0245201 A1    Oct. 18, 2007

Related U.S. Application Data

(60) Provisional application No. 60/784,511, filed on Mar. 21, 2006.

(51) Int. Cl.
*G08C 25/02* (2006.01)

(52) U.S. Cl. ......... 714/748; 709/237; 455/522; 370/345

(58) Field of Classification Search ................... 714/748; 370/345, 347, 473, 467; 455/522; 709/237
See application file for complete search history.

(56) References Cited

U.S. PATENT DOCUMENTS 6,574,668 B1 * 6/2003 Gubbi et al. .................. 709/237
6,575,668 B1 * 6/2003 Lintner ......................... 406/191
7,509,554 B2 * 3/2009 Lohr et al. .................... 714/748
2002/0049068 A1 * 4/2002 Koo et al. ..................... 455/522

(Continued)

FOREIGN PATENT DOCUMENTS

DE    10158755    6/2003

(Continued)

OTHER PUBLICATIONS

3GPP, *3rd Generation Partnership Project; Technical Specification Group Radio Access Network; High Speed Download Packet Access (HSDPA) enhancements (Release 6)*, 3GPP TR 25.899 V6.1.0 (Sep. 2004).

(Continued)

*Primary Examiner* — Sam Rizk
(74) *Attorney, Agent, or Firm* — Volpe and Koenig, P.C.

(57) ABSTRACT

A receiver sends hybrid automatic repeat request (H-ARQ) feedback for a current packet and at least one previous packet, whereby an error is detected based on the H-ARQ feedback. The receiver sends H-ARQ feedback with an identification of the packet or a sequence number of a packet that the receiver expects to receive next. The receiver stores a packet in a memory before combining the packet with a previously received packet, and decodes the stored packet after failing to decode a combined packet to avoid a corruption error. The receiver may set a timer when sending a NACK. If the receiver fails to receive a packet until expiration of the timer, the receiver initiates a process for recovering the packet. Each H-ARQ feedback may be associated with other attributes. Some H-ARQ processes may operate in an asynchronous mode while others in a synchronous mode in the same direction.

10 Claims, 6 Drawing Sheets

U.S. PATENT DOCUMENTS

| | | | |
|---|---|---|---|
| 2002/0172208 A1 | 11/2002 | Malkamaki | |
| 2004/0009780 A1 | 1/2004 | Dick et al. | |
| 2004/0109433 A1* | 6/2004 | Khan | 370/345 |
| 2004/0190523 A1 | 9/2004 | Gessner et al. | |
| 2004/0223507 A1* | 11/2004 | Kuchibhotla et al. | 370/428 |
| 2007/0064669 A1* | 3/2007 | Classon et al. | 370/347 |
| 2007/0168826 A1 | 7/2007 | Terry et al. | |
| 2007/0177630 A1* | 8/2007 | Ranta et al. | 370/473 |
| 2008/0298387 A1* | 12/2008 | Lohr et al. | 370/467 |

FOREIGN PATENT DOCUMENTS

| | | |
|---|---|---|
| EP | 1465371 | 10/2004 |
| EP | 1496639 | 1/2005 |
| EP | 1557968 | 7/2005 |
| EP | 1583270 | 10/2005 |
| WO | 00/08796 | 2/2000 |
| WO | 02/091659 | 11/2002 |
| WO | 03/096298 | 11/2003 |
| WO | 2005/015811 | 2/2005 |
| WO | 2005/125109 | 12/2005 |

OTHER PUBLICATIONS

3GPP, *3rd Generation Partnership Project; Technical Specification Group Radio Access Network; Physical Layer Aspects for Evolved UTRA (Release 7)*, 3GPP TR25.814 V1.0.2 (Jan. 2006).

NTT Docomo et al., 3GPP TSG-RAN1 Meeting#44, Tdoc R1-060435, *Hybrid ARQ Scheme for E-UTRA Downlink*, (Denver, USA Feb. 2006).

Philips, 3GPP TSG-RAN WG2 Meeting#51, Tdoc R2-060428, *Consideration of (H)ARQ layers for LTE*, (Denver, USA Feb. 2006).

Samsung, 3GPP TSG-RAN2 Meeting#49, Tdoc R2-052800, *HARQ Assisted ARQ Operation*, (Seoul, Korea Nov. 2005).

Samsung, 3GPP TSG-RAN2 Meeting#51, Tdoc R2-060374, *MAC functions: ARQ*, (Denver, USA Feb. 2006).

Samsung, 3GPP TSG-RAN2 Meeting#51, Tdoc R2-060376, *Robustness of HARQ assisted ARQ operation*, (Denver, USA Feb. 2006).

3GPP, *3rd Generation Partnership Project; Technical Specification Group Radio Access Network; High Speed Download Packet Access (HSDPA) enhancements (Release 6)*, 3GPP TR 25.899 v6.1.0, (Sep. 2004).

* cited by examiner

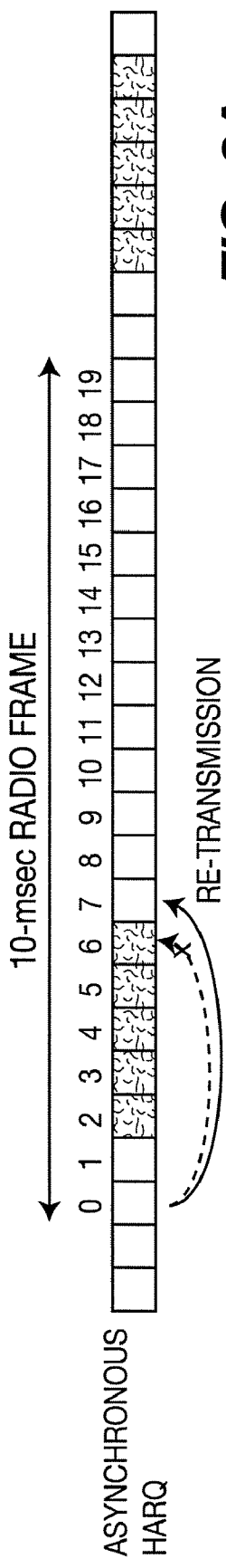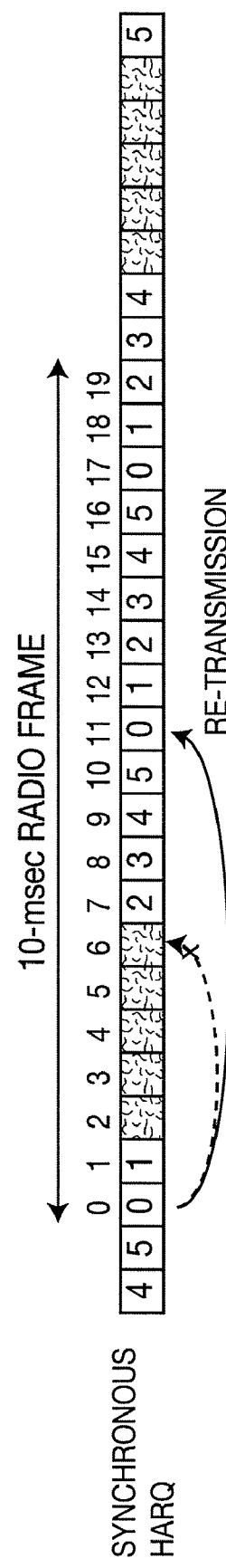

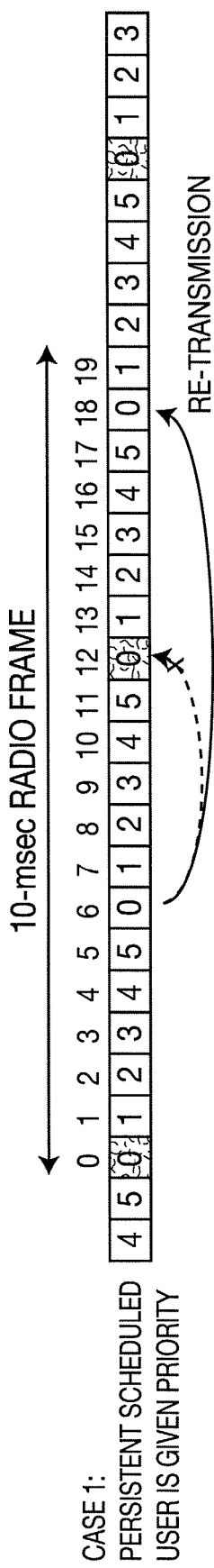
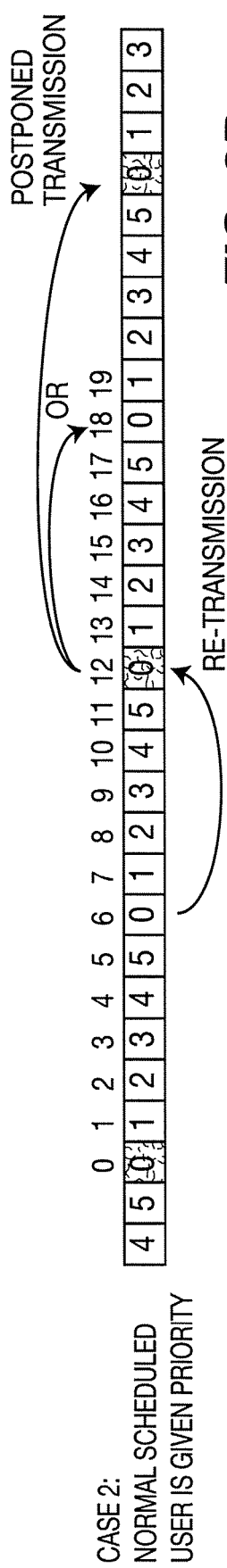
FIG. 3A
PRIOR ART
FIG. 3B
PRIOR ART
x MINIMUM RE-TRANSMISSION INTERVAL
IS ASSUMED TO BE SIX SUB-FRAMES
USED FOR PERSISTENT
SCHEDULED USERS

METHOD AND SYSTEM FOR IMPLEMENTING HYBRID AUTOMATIC REPEAT REQUEST

CROSS REFERENCE TO RELATED APPLICATION

This application claims the benefit of U.S. Provisional Application No. 60/784,511 filed Mar. 21, 2006, which is incorporated by reference as if fully set forth.

FIELD OF INVENTION

The present invention is related to wireless communication systems. More particularly, the present invention is related to a method and system for implementing hybrid automatic repeat request (H-ARQ) in a wireless communication system.

BACKGROUND

In conventional wireless communication systems, such as wideband code division multiple access (WCDMA) Release 5/6, high speed data transmission is achieved by means of high speed downlink packet access (HSDPA) and high speed uplink packet access (HSUPA) technologies. To improve reliability of data transmission, H-ARQ and automatic repeat request (ARQ) are implemented.

H-ARQ and ARQ employ a mechanism to send feedback in the form of a positive acknowledgment (ACK) or a negative acknowledgement (NACK) that respectively indicate successful or unsuccessful receipt of a data packet to a transmitter so that the transmitter may retransmit a failed packet.

In implementing H-ARQ, H-ARQ errors may occur, such as a NACK-to-ACK error, a discontinuous transmission (DTX)-to-ACK error, a buffer corruption error, or the like. The NACK-to-ACK error occurs when a NACK that is sent by a receiver is misinterpreted as an ACK by a transmitter. The DTX-to-ACK error occurs when a DTX special burst transmitted by the receiver is misinterpreted as an ACK by the transmitter. The buffer corruption error occurs when the receiver does not detect a change of packets, (e.g., due to new data indicator (NDI) errors), and combines an old packet with a new different packet, giving rise to memory or buffer corruption.

Several solutions have been proposed to decrease the H-ARQ errors and increase the robustness of the H-ARQ retransmission scheme with respect to error detection, error signaling and error recovery. For error detection, (e.g., detection of a NACK-to-ACK error), an H-ARQ receiver assumes a NACK-to-ACK error if the H-ARQ receiver receives a new transmission while it expects a retransmission. Alternatively, the H-ARQ transmitter assists the H-ARQ receiver in detecting errors by including a 'cause value' along with the transmitted packet to indicate the cause of the previous H-ARQ termination, (e.g., a cause value of '0' indicates that the previous H-ARQ termination is because of ACK reception, and a cause value of '1' indicates that the previous H-ARQ termination is not because of ACK reception, but because of the maximum retransmission limit).

For error signaling, once the H-ARQ receiver detects a potential NACK-to-ACK error, the H-ARQ receiver informs the H-ARQ of the error, (i.e., sends a NACK-to-ACK error indication or an error report in general).

For error recovery, once the H-ARQ transmitter receives the error report, the H-ARQ transmitter notifies the ARQ transmitter by sending a local NACK. This assumes that a timer mechanism is utilized before the local ACK can be generated by the H-ARQ transmitter, which can allow a potential error report to be received within the timer's timeout value, as illustrated in FIG. 1. Once the ARQ transmitter receives the local NACK, the ARQ transmitter can recover the lost packet through ARQ retransmission.

FIG. 1 shows an H-ARQ-assisted ARQ operation proposed for third generation partnership project (3GPP) standards. A transmitter 150 includes an ARQ transmitter 152 and an H-ARQ transmitter 154. A receiver 160 includes an ARQ receiver 162 and an H-ARQ receiver 164. In that proposal, the H-ARQ transmitter 154 provides a local ACK or a local NACK to the ARQ transmitter 152.

A local NACK is generated when the H-ARQ transmitter 154 fails the H-ARQ transmission, (e.g., due to maximum retransmission limit). The ARQ transmitter 152 sends a protocol data unit (PDU) x to the H-ARQ transmitter 154 (step 102). The H-ARQ transmitter 154 sends the PDU x to the H-ARQ receiver 164 (step 104). The PDU x is not decodable and the H-ARQ receiver 164 sends a NACK to the H-ARQ transmitter 154 (step 106). The H-ARQ transmitter 154 retransmits the PDU x to the H-ARQ receiver 164 (step 108). The PDU x is still not decodable and the H-ARQ receiver 164 sends another NACK to the H-ARQ transmitter 154 (step 110). At such point, it is determined that the number of retransmissions for the PDU x reaches a maximum retransmission limit (step 112). The H-ARQ transmitter 154 then sends a local NACK to the ARQ transmitter 152 (step 114).

A local NACK is also generated when an NACK-to-ACK error is reported from the H-ARQ receiver 164 to the H-ARQ transmitter 154. The ARQ transmitter 152 sends a PDU y to the H-ARQ transmitter 154 (step 116). The H-ARQ transmitter 154 transmits the PDU y to the H-ARQ receiver 164 (step 118). The PDU y is not decodable and the H-ARQ receiver 164 sends a NACK to the H-ARQ transmitter 154 (step 120). However, the NACK is misinterpreted as an ACK by the H-ARQ transmitter 154 and the H-ARQ transmitter 154 treats the PCU y as successfully transmitted. The H-ARQ receiver 164 detects an NACK-to-ACK error, (e.g., when the H-ARQ receiver 164 receives a new PDU via the same H-ARQ process while waiting for retransmission of the PDU y), (step 122). The H-ARQ receiver 164 sends a NACK-to-ACK error indicator to the H-ARQ transmitter 154 (step 124). Upon receipt of the NACK-to-ACK error indicator, the H-ARQ transmitter 154 sends a local NACK to the ARQ transmitter 152 and the failed packet is recovered at an ARQ level (step 126).

A local ACK is generated when none of the above two events for an ARQ packet occurs during a predefined time interval. The ARQ transmitter 152 sends a PDU z to the H-ARQ transmitter 154 (step 128). The H-ARQ transmitter 154 transmits the PDU z to the H-ARQ receiver 164 (step 130). The PDU z is successfully decoded and the H-ARQ receiver 164 sends the PDU z to the ARQ receiver 162 and sends an ACK to the H-ARQ transmitter 154 (steps 132, 134). When it is determined that a NACK-to-ACK error is not reported during a predetermined time interval (step 136), the H-ARQ transmitter 154 sends a local ACK to the ARQ transmitter 152 (step 138). The ARQ transmitter 152 will discard the packet from a transmit buffer after receiving the local ACK from the H-ARQ transmitter 154.

There are two modes of H-ARQ operations, synchronous H-ARQ and asynchronous H-ARQ. Synchronous H-ARQ refers to conducting packet retransmissions in a synchronous manner based on a predetermined timing relation. Asynchronous H-ARQ refers to conducting packet retransmissions in a flexible manner that is not constrained by a specific timing relationship. In adaptive H-ARQ, the transmission format, (e.g., data modulation, channel coding rate, and assigned resource blocks), may be changed adaptively between the initial transmission and retransmissions.

Currently, both synchronous and asynchronous H-ARQ modes are being considered for evolved universal terrestrial radio access (UTRA+) and long term evolution (LTE) of 3GPP, but only one mode is to be supported in a single direction, (i.e., uplink or downlink). Due to multimedia broadcast multicast services (MBMS) and persistent scheduling for real-time service, (such as voice over IP (VoIP)), delay may be caused for some H-ARQ retransmissions.

In the downlink, if MBMS is multiplexed with unicast in a time division multiplexing (TDM) manner, both synchronous and asynchronous H-ARQ will have extra retransmission delay caused by sub-frames occupied by MBMS. FIGS. 2A and 2B show the impact of MBMS on the retransmission for asynchronous or synchronous H-ARQ transmissions, respectively. In these examples, the minimum retransmission interval is assumed to be six (6) subframes. In FIG. 2A (asynchronous H-ARQ), the H-ARQ retransmission at subframe 6 is conflict with MBMS transmissions and should be rescheduled to subframe 7. In FIG. 2B (synchronous H-ARQ), a packet is initially transmitted at subframe 0 and scheduled to be retransmitted at subframe 6. However, subframes 2-6 are occupied by MBMS data transmission and the H-ARQ retransmission should be rescheduled to the next available subframe, (subframe 12).

Both in the uplink and the downlink, for the services with frequent transmissions of small packets at regular intervals such as VoIP, long-term fixed resource allocation, (i.e., persistent scheduling), is performed in order to reduce the control signaling overhead. However, when synchronous H-ARQ is implemented with persistent scheduling, some of the retransmissions are restricted due to the long-term fixed resource allocation. FIGS. 3A and 3B show conflicts of synchronous H-ARQ transmissions with persistent scheduling. Either a retransmission of a normal scheduled user or a retransmission of a persistent scheduled user is given a priority and the other should be delayed. FIG. 3A shows the case that a persistent scheduled user is given a priority and FIG. 3B shows the case that a normal scheduled user is given priority.

FIG. 4 shows problems of synchronous H-ARQ transmissions with adaptive transmission time interval (TTI). Assuming a variable retransmission interval according to the TTI length, in synchronous H-ARQ, it is not possible to retransmit a packet after the retransmission interval when a different TTI length is accommodated within a radio frame. In FIG. 4, a first packet is assigned a short TTI (1 subframe) and a second packet is assigned a long TTI (2 subframes). The first frame is initially transmitted at subframe 2 and scheduled to be retransmitted with an interval of 6 subframes thereafter, (i.e., subframes 8, 14, 20, . . . ). The second frame is transmitted at subframes 5 and 6 and scheduled to be retransmitted with an interval of 6 frames thereafter, (i.e., subframes 12, 13, 19, 20, . . . ). At subframe 20, a conflict occurs and one of them should be rescheduled.

Therefore, it would be desirable to provide more efficient and robust solutions for supporting synchronous and/or asynchronous H-ARQ operations.

SUMMARY

The present invention is related to a method and system for implementing H-ARQ in a wireless communication system. An H-ARQ receiver sends an H-ARQ feedback message including an H-ARQ feedback for a current packet and an H-ARQ feedback for at least one previous packet, whereby an H-ARQ transmitter detects an error based on the H-ARQ feedback. The H-ARQ receiver sends an H-ARQ feedback message with an identification of the packet or a sequence number of a packet that the H-ARQ receiver expects to receive next. The H-ARQ receiver stores a packet in a memory before combining the packet with a previous received packet, and decodes the packet stored in the memory after failing to decode a combined packet to avoid a corruption error. The H-ARQ receiver may set a timer when sending a NACK. If the H-ARQ receiver fails to receive a packet by the expiration of the timer, the H-ARQ receiver may initiate a process for recovering the packet. An ACK and a NACK may be associated with other attribute. H-ARQ processes may be configured such that some operate in an asynchronous mode and others operate in a synchronous mode in the same direction. Alternatively, the H-ARQ mode may be dynamically switched between a synchronous mode and an asynchronous mode.

BRIEF DESCRIPTION OF THE DRAWINGS

A more detailed understanding of the invention may be had from the following description of a preferred embodiment, given by way of example and to be understood in conjunction with the accompanying drawings wherein:

FIGS. 2A and 2B show the impact of MBMS on the retransmission for asynchronous or synchronous H-ARQ transmissions;

FIGS. 3A and 3B show conflicts of synchronous H-ARQ transmissions with persistent scheduling;

DETAILED DESCRIPTION OF THE PREFERRED EMBODIMENTS

The embodiments of the present invention may be implemented at both a base station and a wireless transmit/receive unit (WTRU). The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP) or any other type of interfacing device capable of operating in a wireless environment.

In accordance with a first embodiment of the present invention, the H-ARQ feedback from the H-ARQ receiver to the H-ARQ transmitter includes ACK/NACK feedback both for the current packet and at least one previously transmitted packet as opposed to a conventional H-ARQ feedback which comprises feedback only for the most recently transmitted packet, (i.e., current packet). The previously transmitted packet does not include retransmitted packets. The packets may be ordered in time that the packets are transmitted irrespective of the transmission sequence numbers (TSNs) of the packets, (i.e., the ACK/NACK feedback indicates the transmission status of the current packet and packets transmitted earlier than the current packet). Alternatively, the packets may be ordered in accordance with TSNs of the packets, (i.e., the ACK/NACK feedback indicates the transmission status of the current packet and the packets having TSNs less than the TSN of the current packet). The current packet and the previous packet refer to packets within the same traffic flow at any level, (e.g., H-ARQ flow, MAC flow, ARQ-level flow, a flow to and from a given WTRU address and on a given QoS class, or the like).

Figure 1:
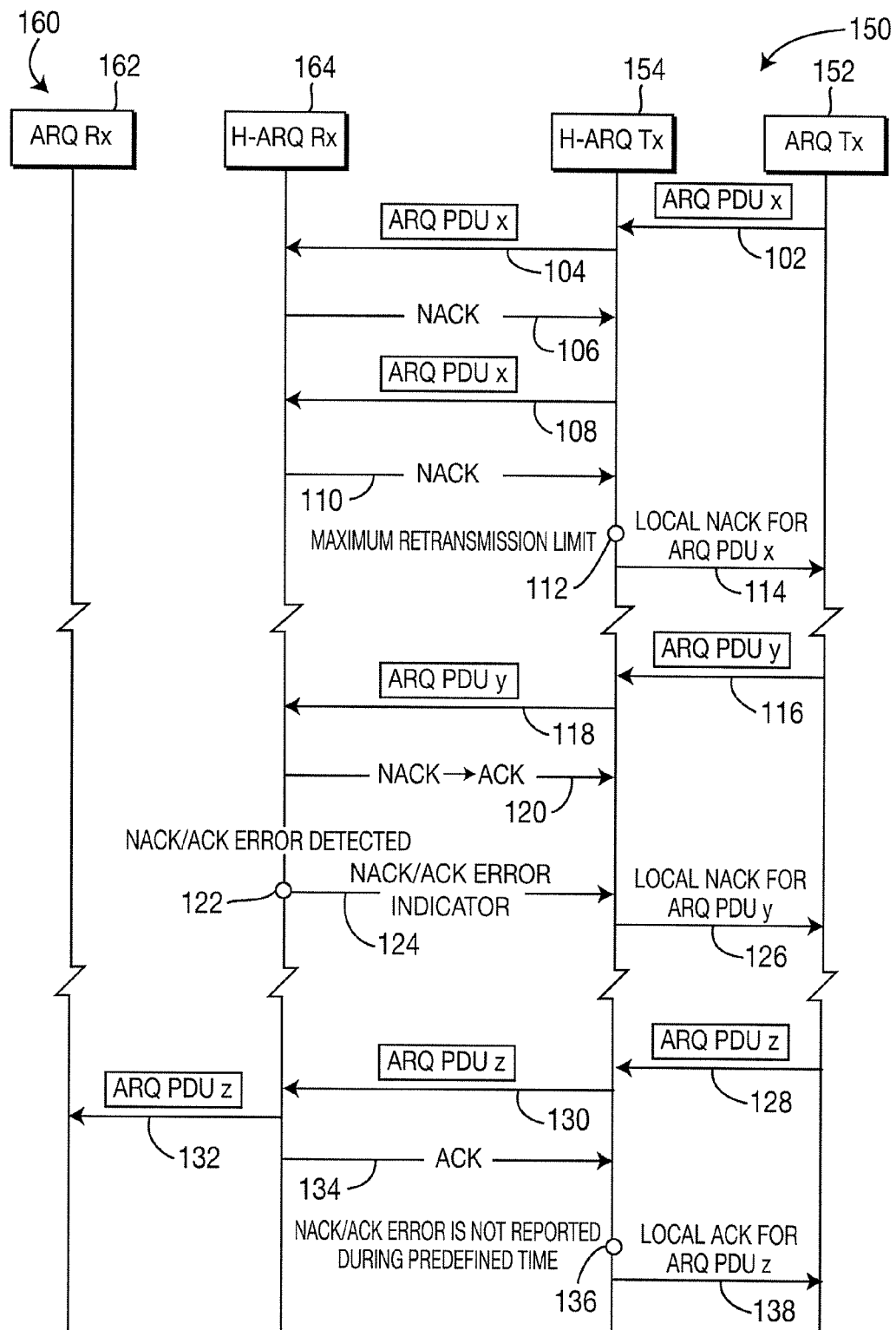
FIG. 1 shows an H-ARQ-assisted ARQ operation proposed for 3GPP standards.
Figure 4:
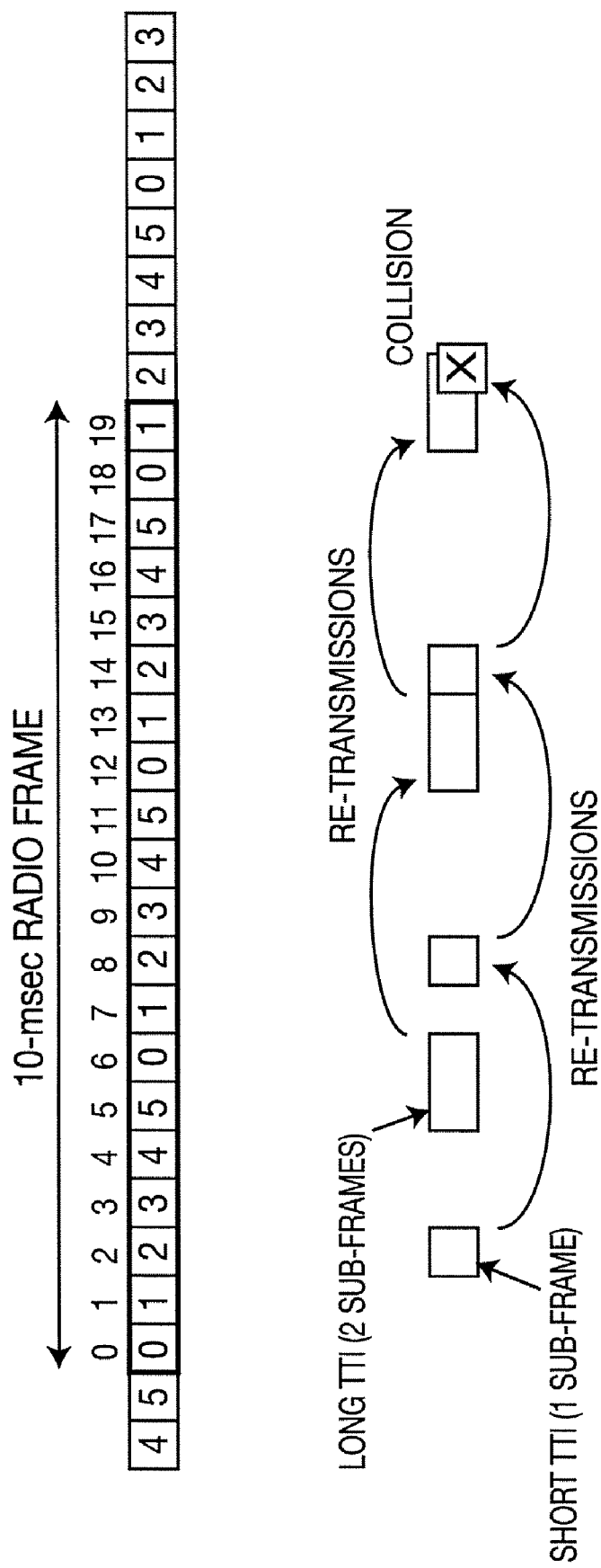
FIG. 4 shows problems of synchronous H-ARQ transmissions with adaptive TTI.
Figure 5:
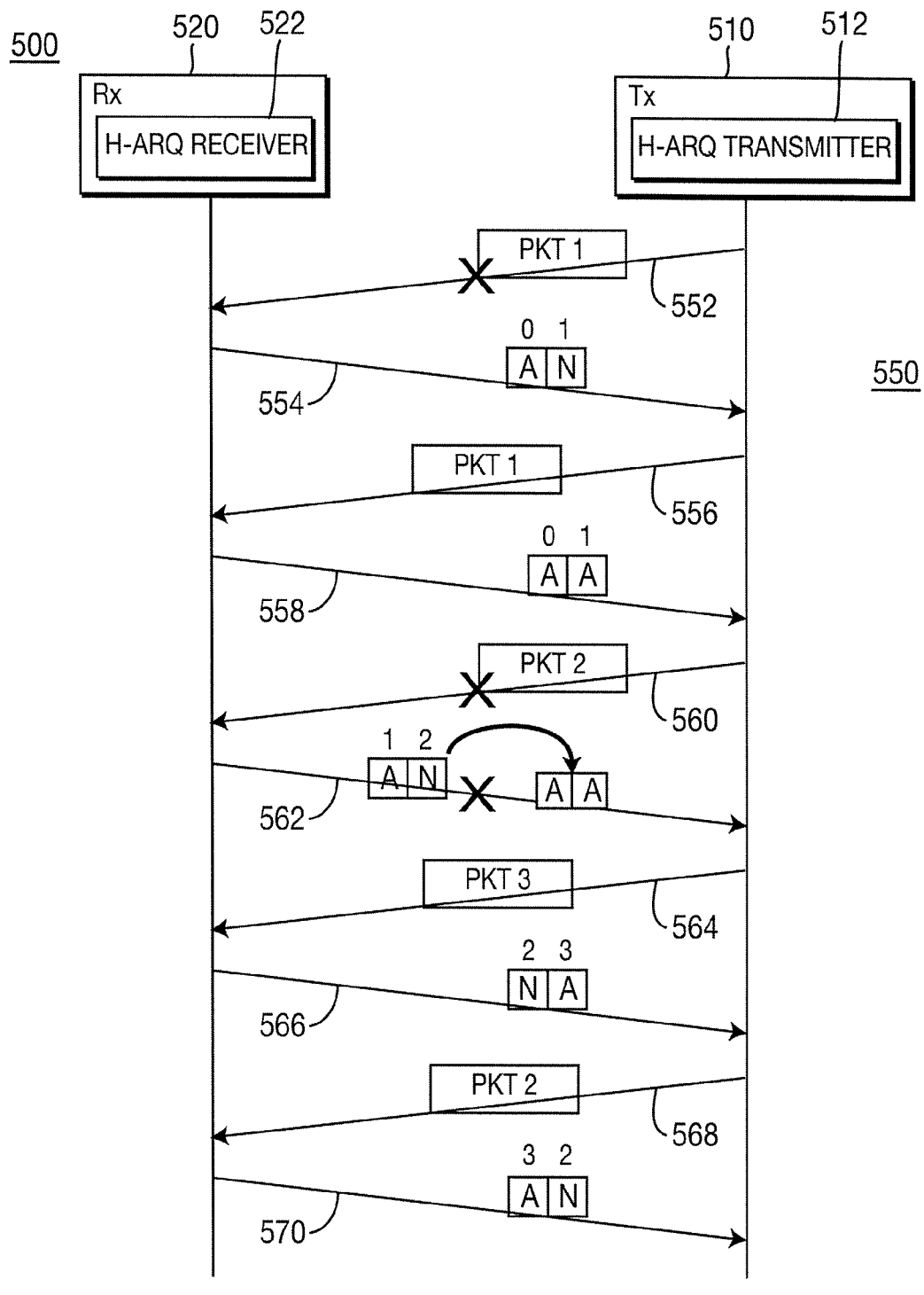
FIG. 5 shows an exemplary process for detecting an H-ARQ error in a wireless communication system in accordance with a first embodiment of the present invention.

FIG. 5 is a signaling diagram of an exemplary process 550 for detecting an H-ARQ operation error in a wireless communication system 500 in accordance with the first embodiment of the present invention. When referred to hereinafter, the terminology "H-ARQ operation error" refers to errors occurring on the H-ARQ ACK/NACK feedback, such as a NACK-to-ACK misinterpretation error or any error that leads to a corruption or misinterpretation of the original H-ARQ feedback status.

The system 500 includes a transmitter 510 and a receiver 520. The transmitter 510 includes an H-ARQ transmitter 512 and the receiver 520 includes an H-ARQ receiver 522. The transmitter 510 may include an ARQ transmitter (not shown) and the receiver 520 may include an ARQ receiver (not shown). The H-ARQ transmitter 512 transmits a packet 1, which is not correctly received by the H-ARQ receiver 522 due to an error (step 552). The H-ARQ receiver 522 reports a NACK for packet 1, (i.e., current packet), and an ACK for the previous packet, (e.g., packet 0), assuming that the packet 0 has been received correctly (step 554).

Upon receipt of a NACK for packet 1, the H-ARQ transmitter 512 retransmits the packet 1, which is correctly received by the H-ARQ receiver 522 (step 556). The H-ARQ receiver 522 then reports an ACK for packet 1 and an ACK for the previous packet, (e.g., packet 0), (step 558). After receiving an ACK the packet 1, the H-ARQ transmitter 512 moves on to transmit packet 2, which is not correctly received by the H-ARQ receiver 522 (step 560). The H-ARQ receiver 522 reports a NACK for packet 2 and an ACK for the previous packet, (i.e., packet 1), (step 562). However, a NACK-to-ACK error occurs on the feedback for packet 2 and the H-ARQ transmitter 512 receives an ACK for packet 2 erroneously at step 562. Hence, the H-ARQ transmitter 512 moves on to transmit packet 3, which is correctly received by the H-ARQ receiver 522 (step 564).

The H-ARQ receiver 522 subsequently reports an ACK for packet 3 and a NACK for the previous packet, (i.e., packet 2), (step 566). The H-ARQ transmitter 522 receives an ACK for packet 3 and a NACK for packet 2 and recognizes that a NACK-to-ACK error had occurred for packet 2. The H-ARQ transmitter 512 then retransmits packet 2, which is correctly received by the H-ARQ receiver 522 (step 568). Alternatively, the H-ARQ transmitter 512 may notify an RLC layer (not shown) of the error and packet 2 may be recovered at an ARQ level. The H-ARQ receiver 522 then sends an ACK for packet 2 and an ACK for packet 3 (step 570).

In accordance with the first embodiment of the present invention, the H-ARQ transmitter 512 may detect an H-ARQ error without using a full error report or sending 'cause value' along with packet transmissions, as in the prior art. It is more effective in detecting H-ARQ operation errors and more efficient and faster in signaling such errors.

It should be noted that in the example of FIG. 5, the H-ARQ receiver 522 sends feedback for only two packets, (i.e., the current packet and one previous packet), but the H-ARQ receiver 522 may send feedback for any number of previous packets. The H-ARQ transmitter 512 assumes that an H-ARQ error has occurred if the H-ARQ transmitter 512 does not receive multiple ACKs for each packet. In the above example, the H-ARQ transmitter 512 assumes an H-ARQ error if the H-ARQ transmitter 512 does not receive a first ACK on the H-ARQ feedback following the transmission of the current packet and a second ACK on the H-ARQ feedback following the transmission of the next packet.

Additionally, if there are several retransmissions of a packet before an ACK is received, the H-ARQ transmitter 512 may verify that the feedback for the previous packet is consistent. For example, when the H-ARQ transmitter 512 transmits packet 2, the H-ARQ feedback will correspond to packet 2 and the previous packet 1. When packet 2 is retransmitted, the H-ARQ feedback will correspond to packet 2 and the previous packet 1. Hence, for packet 1, more than one H-ARQ feedback is received which can be verified by the H-ARQ transmitter 512, (e.g., if both are indeed ACKs, or if one of them was a NACK).

Alternatively, the H-ARQ transmitter 512 may assume that a packet is not successfully transmitted if the H-ARQ transmitter 512 receives at least one NACK in any of multiple H-ARQ feedback. In the above example, the H-ARQ transmitter 512 assumes an unsuccessful transmission of the current packet if the H-ARQ transmitter 512 receives a NACK on the H-ARQ feedback following the transmission of the current packet or a NACK on the H-ARQ feedback following the transmission of the next packet. Alternatively, the number of ACKs or the number of NACKs received in multiple H-ARQ feedback messages may be considered to decide whether an H-ARQ error has occurred. In the case of multiple feedback, a threshold may be used. For example, the packet is considered in error if x out of y feedback are NACKs. Alternatively, the packet is considered correctly received and need not be retransmitted by the transmitter if z out of y feedback are ACKs.

In transmitting an H-ARQ feedback, the bits reserved for transmitting ACK or NACK feedback information may be split to send multiple H-ARQ feedback. In HSDPA, an H-ARQ feedback comprises one (1) information bit and it is simply repeated 10 times within a single H-ARQ feedback message. The H-ARQ feedback of the current packet may be repeated for 5 times and the H-ARQ feedback of the previous packet may be repeated 5 times, which will result in the same overhead per packet. Alternatively, the H-ARQ feedback for the current packet and the previous packet may be repeated for different numbers or different number of coded bits or other types of encoding may be used. Preferably, a Reed-Solomon (R-S) coding may be used to code multiple H-ARQ feedback.

The error recovery, (e.g., packet retransmission), may be handled at an H-ARQ level or an ARQ level. Where the error recovery is handled at an H-ARQ level, the H-ARQ transmitter 512 has sufficient memory, (e.g., the H-ARQ transmitter 512 is capable of storing a copy of the current packet and a copy of the previous packet(s) for retransmission), and performs retransmission of the previous packet at an H-ARQ level, (i.e., without necessarily involving the ARQ retransmission mechanism). Where the error recovery is handled at an ARQ level, (i.e., Outer ARQ or RLC level), once the H-ARQ error, (e.g., a NACK-to-ACK error), is identified by the H-ARQ transmitter 512, the H-ARQ transmitter 512 sends a local NACK, (or multiple local NACKs if there are multiple ARQ packets within the H-ARQ packet), to the ARQ transmitter, (i.e., Outer-ARQ entity or RLC entity), so that the ARQ transmitter perform subsequent retransmission of the lost packet.

A local NACK may be sent by the H-ARQ transmitter 512 to an ARQ transmitter as soon as the H-ARQ transmitter 512 receives either the first NACK or the second NACK (in the case M=2). Alternatively, the local NACK may be sent by the H-ARQ transmitter 512 only after receiving the second feedback message, if any of the two feedback messages contains a NACK. Alternatively, the local NACK may be sent by the H-ARQ transmitter 512 after a certain time period passes without receiving either or both feedback messages.

A local ACK may be sent by the H-ARQ transmitter 512 to the ARQ transmitter when the H-ARQ transmitter 512 receives both the first ACK and the second ACK. Unlike the prior art, the H-ARQ transmitter 512 does not need to make use of a timer, (although it may optionally do so), to decide whether it can send a local ACK to the ARQ transmitter.

In accordance with a second embodiment of the present invention, the H-ARQ feedback includes an identification of the packet for which the H-ARQ feedback is intended. Conventionally, the H-ARQ feedback consists of ACK or NACK only information and the H-ARQ feedback does not explicitly identify the packet for which the ACK or NACK was sent, since it is implicitly assumed to be for the previously received packet. In errors related to buffer corruption, NACK-to-ACK error or DTX-to-ACK error, the explicit identification of the packet enables reliable detection of the error and subsequent recovery actions.

The identification of the packet may be a sequence number, a part of the sequence number, a new data indicator (NDI), or the like. An NDI can be considered a sequence number consisting of 1 bit only. The sequence number is not necessarily a higher level sequence number, (e.g., ARQ or RLC sequence number or TSN). The sequence number may be any sequence number and preferably a sequence number that is defined on an H-ARQ process level, (e.g., each packet transmission on the H-ARQ process (but not retransmissions) increments the sequence number for that H-ARQ process).

The H-ARQ transmitter keeps track of the latest sequence number it has transmitted. If the H-ARQ transmitter receives an H-ARQ feedback on a different sequence number, the H-ARQ transmitter recognizes that an error has occurred or that there is a lack of synchronization in the sequence numbers between the H-ARQ transmitter and the H-ARQ receiver. Since the H-ARQ feedback includes the packet identification which the H-ARQ feedback refers to, the H-ARQ transmitter may detect the errors such as NACK-to-ACK error, DIX-to-ACK error, or buffer corruption, and H-ARQ robustness and reliability is improved. Such detection is achieved via detecting gaps in the sequence numbers. For example, if the receiver expects to receive sequence number 10 but received 11 then it concludes that an error has probably occurred that caused sequence number 10 to be missing.

Alternatively, or additionally, the H-ARQ receiver may provide a sequence number that the H-ARQ receiver expects to receive next as part of the H-ARQ feedback. The H-ARQ transmitter keeps track of the sequence number that the H-ARQ transmitter will transmit. For example, if the H-ARQ receiver receives packet 0 correctly, the H-ARQ receiver sends as part of the H-ARQ feedback that it next expects to receive sequence number 1. If the packet 0 was not correctly received, the H-ARQ receiver indicates that it still expects a sequence number 0. Upon receiving the H-ARQ feedback, the H-ARQ transmitter considers all values different than its locally maintained sequence number as NACK. Only if the sequence number indicated in the H-ARQ feedback matches the locally maintained sequence number will be assumed as an ACK.

Alternatively, the receiver may send the sequence number of the packet the receiver last received. The transmitter concludes whether the packet was received successfully or not by comparing the received sequence number with the sequence number of the latest successfully received packet maintained at the receiver.

In order to advance or synchronize the sequence number when the sequence number is misaligned between the H-ARQ transmitter and the H-ARQ receiver, (e.g. when the H-ARQ transmitter gives up after reaching the maximum retransmission limit), the H-ARQ transmitter may send an explicit signal to the H-ARQ receiver to increment the sequence number or send the next sequence number via in-band signaling. Alternatively, the H-ARQ receiver may increment the sequence number on its own based on implicit information rather than explicit signaling, (e.g. after several attempts or after 2 new packets of indicating that the previous sequence number has not been received).

The above embodiment helps resolve the buffer corruption problem in certain implementations. For example, the buffer corruption occurs when there are multiple errors leading the H-ARQ receiver to combine packet 0 with new packet 2, for example. In that case, the H-ARQ transmitter is sending packet 2 while the H-ARQ receiver is expecting packet 0 and has completely missed receiving packet 1, and since the H-ARQ transmitter does not know what the H-ARQ receiver is acknowledging, the H-ARQ transmitter will keep retransmitting a different packet and then move on to transmitting other packets while the H-ARQ receiver memory is corrupt. By including identification in the H-ARQ feedback, the H-ARQ transmitter may identify and detect that there is a potential error due to the lack of synchronization between the sequence number that the H-ARQ transmitter is sending and the sequence number that the H-ARQ receiver is expecting, and hence take corrective action or trigger ARQ recovery scheme.

Optionally, the H-ARQ feedback message may include an indication whether the H-ARQ receiver has flushed its memory along with a NACK feedback. This is useful because the H-ARQ receiver is informing the H-ARQ transmitter that the NACK it is sending is based on a buffer that has or has not been flushed. If the H-ARQ transmitter continues to receive multiple NACKs while the buffer flush indicator indicates that the buffer has not been flushed for a while, the H-ARQ transmitter may take corrective actions assuming that buffer corruption has occurred, (e.g., the H-ARQ transmitter may send a buffer flush command or send a new packet to flush the buffer).

More generally, the H-ARQ feedback message may include an indicator on whether the H-ARQ receiver buffer has been flushed or not. The H-ARQ transmitter expects that the H-ARQ receiver indicates that it flushed its memory every time the H-ARQ receiver receives a new packet from the H-ARQ transmitter, (a new packet may be indicated by an NDI or TSN). The H-ARQ receiver may simply include (report back) the received NDI or TSN or part of the TSN within its H-ARQ feedback message.

In accordance with a third embodiment of the present invention, the H-ARQ receiver assumes that buffer corruption may occur when the H-ARQ receiver is about to combine two packets and stores a newly received packet in a memory before combining it with an old packet. If the combined packet is still not decodable, the H-ARQ receiver decodes the packet stored in the memory on its own, which might lead to a successful decoding, and hence circumvent the buffer corruption problem.

The H-ARQ receiver requires more resources (either memory or computing power). Accordingly, a certain H-ARQ process may be given a higher priority, and the processing for certain H-ARQ process may occur at the expense of the other concurrent H-ARQ processes. The available resources, (e.g., H-ARQ process memories or computing power), may be pooled and dynamically or semi-statically allocated or shared among multiple H-ARQ processes. Such resource allocation function takes into account the number of retransmissions and/or the likelihood that buffer corruption may occur.

Figure 6:
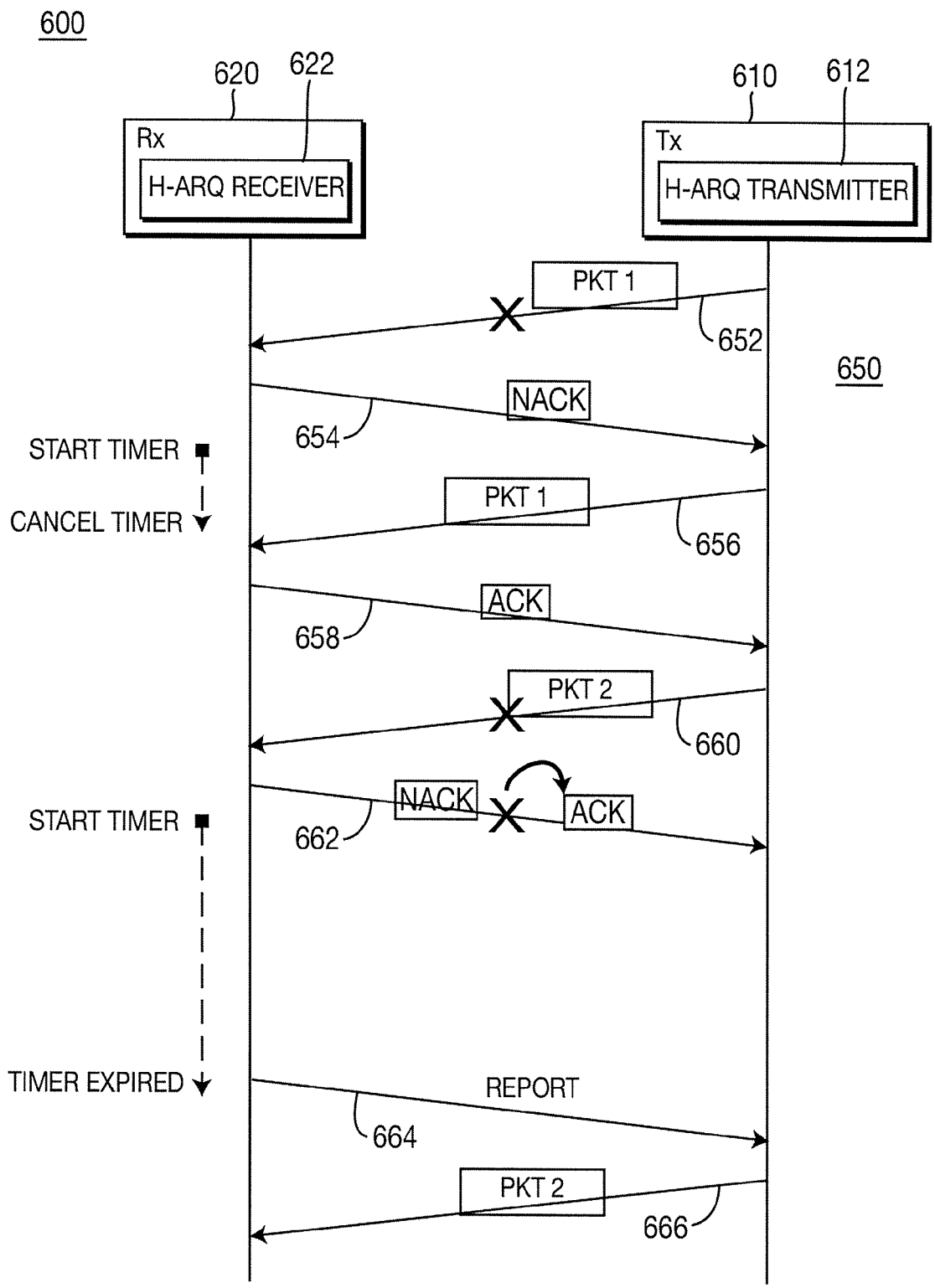
FIG. 6 is a flow diagram of a process for H-ARQ-assisted ARQ in accordance with the fourth embodiment of the present invention.

In accordance with a fourth embodiment of the present invention, an H-ARQ receiver assists an ARQ receiver, as opposed to conventional H-ARQ-assisted ARQ operation wherein the H-ARQ transmitter assists the ARQ transmitter. FIG. 6 is a flow diagram of a process 650 for H-ARQ-assisted ARQ in a wireless communication system 600 in accordance with the fourth embodiment of the present invention. The system 600 includes a transmitter 610 and a receiver 620. The transmitter 610 includes an H-ARQ transmitter 612 and the receiver 620 includes an H-ARQ receiver 622. The transmitter 610 may include an ARQ transmitter (not shown) and the receiver 620 may include an ARQ receiver (not shown). The H-ARQ transmitter 612 transmits packet 1, which is not correctly received by the H-ARQ receiver 622 due to an error (step 652). The H-ARQ receiver 622 subsequently reports a NACK for packet 1, and starts a timer following the transmission of the NACK (step 654). The H-ARQ transmitter 612 receives a NACK for packet 1, and retransmits packet 1, which is correctly received by the H-ARQ receiver 622 (step 656). Upon receiving a packet from the H-ARQ transmitter 612, the H-ARQ receiver 622 resets the timer, and subsequently reports an ACK for packet 1 (step 658).

The H-ARQ transmitter 612 receives an ACK for packet 1, and moves on to transmit packet 2, which is not correctly received by the H-ARQ receiver 622 (step 660). The H-ARQ receiver 622 subsequently reports a NACK for packet 2, and starts a timer following the transmission of the NACK (step 662). A NACK-to-ACK error occurs on the H-ARQ feedback for packet 2 and the H-ARQ transmitter 612 receives an ACK for packet 2 erroneously at step 662.

If the H-ARQ receiver 622 does not receive the packet 2 before expiration of the timer, the H-ARQ receiver 622 may send an H-ARQ-level report to the H-ARQ transmitter 612 to notify the error in order to recover the packet 2 at an H-ARQ level (step 664). The H-ARQ transmitter 612 receives the H-ARQ-level report and retransmits the packet 2 to the H-ARQ receiver 622 at an H-ARQ level (step 666). Alternatively, the H-ARQ receiver 622 may notify an ARQ receiver, and the ARQ receiver may send a report to an ARQ transmitter to notify such error in order to recover the packet 2 at an ARQ level (processing step not shown).

This embodiment may be implemented along with "cause value" method described in background.

In accordance with a fifth embodiment of the present invention, an ACK and/or a NACK is associated with other signals or characteristics in order to increase robustness and reliability of the ACK and/or NACK feedback messages. The ACK and/or NACK may be associated with a channel quality indicator (CQI). CQI reporting enhancements in addition to regular CQI reporting are known in the art. In accordance with the present invention, additional CQI reporting may be initiated along with every ACK and/or NACK feedback. For example, CQI reporting may be configured such that every NACK (but not ACK), or vice versa, will have a CQI report. Therefore, if an ACK is received with a CQI report, the H-ARQ feedback may be suspected or considered as a NACK. Such association between CQI and H-ARQ ACK or NACK is used to improve H-ARQ feedback reliability and H-ARQ error detection.

Alternatively, the ACK and/or NACK may be associated with some time, frequency and/or space attributes. For example, NACKs may be sent in certain orthogonal frequency division multiplexing (OFDM) symbols and ACKs in other OFDM symbols within a frame, sub-frame or transmission time interval (TTI). Alternatively, a TTI may be partitioned into an early slot and a late slot and NACKs may be sent in an early slot and ACKs may be sent in a late slot, or vice versa. Alternatively, ACKs may be sent on odd timeslots or symbols while NACKs may be sent on even timeslots or symbols, or vice versa. A NACK may be associated with any physical layer (PHY) or MAC attribute(s) in set A, and an ACK may be associated with any PHY or MAC attribute(s) in set B, where ideally A and B are mutually exclusive.

In accordance with a sixth embodiment of the present invention, both synchronous and asynchronous H-ARQ modes may be supported in the same direction, (i.e., uplink or downlink), as opposed to a conventional scheme in which only one of the asynchronous mode and the synchronous mode is supported in a given direction. Both the H-ARQ transmitter and the H-ARQ receiver include a plurality of H-ARQ processes. Among those H-ARQ processes, some H-ARQ processes are configured to operate in asynchronous mode while other H-ARQ processes are configured to operate in synchronous mode. A control signaling, (e.g., broadcast information), is used to indicate which H-ARQ processes, (i.e., H-ARQ process IDs), are running in which mode.

A semi-static signaling may be used between the H-ARQ transmitter and the H-ARQ receiver to identify which H-ARQ processes run in asynchronous or synchronous modes in a semi-static or dynamic fashion. Such signaling may be conducted via radio resource control (RRC) signals, H-ARQ-level signals, or signaling in any layers.

Alternatively, fully-dynamic support and switching between asynchronous and synchronous H-ARQ modes may be achieved by dynamic signaling along with packet transmissions, (e.g., via using one or more bits within the data-associated control signals), to indicate whether potential subsequent retransmissions of an initial packet will occur in a synchronous or asynchronous mode. In this regard, the synchronous mode can be viewed as a special case of the more general asynchronous mode, where each packet may specify whether potential retransmissions will occur synchronously relative to the initial transmission, or asynchronously.

Alternatively, the H-ARQ transmitter may implicitly or explicitly indicate within its transmitted packet the potential time instance or frame or subframe number where potential subsequent retransmissions may occur. Such dynamic signaling may be advantageous in resolving some of the shortcomings of synchronous H-ARQ, such as those related to increased delay or more complex implementations when synchronous H-ARQ is implemented with persistent scheduling, MBMS scheduling, or adaptive TTI. In order to speed up the retransmission and reduce the delay when such problems occur, a dynamic signaling may be used and the H-ARQ transmitter may dynamically indicate to the H-ARQ receiver that it shall expect retransmissions in an asynchronous or synchronous mode.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, performed by a receiver, of implementing hybrid automatic repeat request (H-ARQ), the method comprising:
   receiving a packet;
   storing the packet in a memory before combining the packet with a previous received packet;
   decoding a combined packet; and
   decoding the packet stored in the memory on a condition that the decoding of the combined packet failed.

2. The method of claim 1 wherein available resources are pooled and dynamically allocated for multiple H-ARQ processes and a certain H-ARQ process is given a higher priority for the resources.

3. A method, performed by a receiver, of implementing hybrid automatic repeat request (H-ARQ), the method comprising:
   transmitting a negative acknowledgement (NACK);
   setting a timer in response to the transmission of the NACK;
   clearing the timer on a condition that a packet corresponding to the NACK is received; and
   initiating a process for recovering the packet on a condition that a packet corresponding to the NACK is not received.

4. The method of claim 3 further comprising:
   transmitting a report indicating an H-ARQ error to recover a failed packet at an H-ARQ level.

5. The method of claim 3 further comprising:
   transmitting a local NACK indicating an H-ARQ error.

6. A receiver for implementing hybrid automatic repeat request (H-ARQ), the receiver configured to:
   receive a packet;
   store the packet in a memory before combining the packet with a previous received packet;
   decode a combined packet; and
   decode the packet stored in the memory on a condition that the decoding of the combined packet failed.

7. The receiver of claim 6 wherein available resources are pooled and dynamically allocated for multiple H-ARQ processes and a certain H-ARQ process is given a higher priority for the resources.

8. A receiver for implementing hybrid automatic repeat request (H-ARQ), the receiver configured to:
   transmit a negative acknowledgement (NACK);
   set a timer in response to the transmission of the NACK;
   clear the timer on a condition that a packet corresponding to the NACK is received; and
   initiate a process for recovering the packet on a condition that a packet corresponding to the NACK is not received.

9. The receiver of claim 8 wherein the receiver is further configured to transmit a report indicating an H-ARQ error to recover a failed packet at an H-ARQ level.

10. The receiver of claim 8 wherein the receiver is further configured to transmit a local NACK indicating an H-ARQ error.

* * * * *